(12) United States Patent
Lake

(10) Patent No.: US 6,630,887 B2
(45) Date of Patent: Oct. 7, 2003

(54) ELECTRICAL APPARATUSES, AND METHODS OF FORMING ELECTRICAL APPARATUSES

(75) Inventor: Rickie C. Lake, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/757,718

(22) Filed: Jan. 8, 2001

(65) Prior Publication Data

US 2001/0001236 A1 May 17, 2001

Related U.S. Application Data

(62) Division of application No. 09/384,837, filed on Aug. 27, 1999, now Pat. No. 6,313,748.

(51) Int. Cl.[7] .............................................. G08B 23/00
(52) U.S. Cl. ................... 340/573.2; 340/693.5; 340/572.1; 340/572.8; 340/870.16; 29/740; 43/132.1; 361/794; 361/792; 174/34; 73/587
(58) Field of Search ......................... 340/573.2, 573.1, 340/632, 602, 693.9, 693.12, 693.5, 572.1, 572.8, 870.16; 29/740, 739; 73/587; 63/137.1, 124; 361/794, 792, 793, 803; 174/34, 36, 52.4, 254; 716/1

(56) References Cited

U.S. PATENT DOCUMENTS

| | | |
|---|---|---|
| 3,778,805 A | 12/1973 | Gould |
| 4,136,338 A | 1/1979 | Antenore |
| 4,455,441 A | 6/1984 | Prestwich |
| 4,737,789 A | 4/1988 | Nysen |
| 4,937,555 A | 6/1990 | Litzkow et al. ............ 340/540 |
| 4,951,057 A | 8/1990 | Nagel |
| 5,024,832 A | 6/1991 | Omata et al. |
| 5,182,420 A | 1/1993 | Steitz et al. ............... 174/52.4 |
| 5,205,032 A | 4/1993 | Kuroda et al. ............... 29/740 |
| 5,266,746 A | 11/1993 | Nishihara et al. ........... 174/254 |
| 5,274,570 A | 12/1993 | Izumi et al. ................... 716/1 |
| 5,329,726 A | 7/1994 | Thorne et al. |
| 5,384,691 A | 1/1995 | Neugebauer et al. ........ 361/794 |
| 5,428,345 A | 6/1995 | Bruno |
| 5,459,284 A | 10/1995 | Bockelman et al. .......... 174/34 |
| 5,471,010 A | 11/1995 | Bockelman et al. .......... 174/36 |
| 5,571,967 A | * 11/1996 | Tanaka et al. ................ 73/587 |
| 5,575,105 A | 11/1996 | Otomo ...................... 43/132.1 |
| 5,592,774 A | 1/1997 | Galyon |
| 5,646,404 A | 7/1997 | Litzkow et al. ........... 250/338.1 |
| 5,648,758 A | 7/1997 | Tweadey |
| 5,815,090 A | * 9/1998 | Su ....................... 340/870.16 |
| 5,877,422 A | * 3/1999 | Otomo ........................ 73/587 |

(List continued on next page.)

OTHER PUBLICATIONS

Website: Dow AgroSciences, Sentricon Colony Elimination System:, 1998, 7 pgs.

*Primary Examiner*—Julie Lieu
(74) *Attorney, Agent, or Firm*—Wells St. John P.S.

(57) ABSTRACT

The invention encompasses an electrical apparatus. Such apparatus comprises a first substrate having first circuitry supported thereby. The first circuitry defines at least a portion of a radio frequency identification device. At least one first electrical node is supported by the substrate and in electrical connection with the first circuitry. The apparatus further comprises an input device comprising a second substrate and second circuitry on the second substrate. The second circuitry is in electrical communication with at least one second electrical node. Neither of the first nor second electrical nodes is a lead, and the second electrical node is adhered to the first electrical node to electrically connect the input device with the radio frequency identification device. The invention also encompasses a termite-sensing apparatus. Additionally, the invention encompasses methods of forming electrical apparatuses, and methods for sensing termites.

17 Claims, 7 Drawing Sheets

U.S. PATENT DOCUMENTS

| | | |
|---|---|---|
| 5,950,356 A | 9/1999 | Nimocks |
| 5,974,344 A | 10/1999 | Shoemaker |
| 5,977,913 A * | 11/1999 | Christ ........................ 342/465 |
| 6,016,625 A | 1/2000 | Bishoff et al. |
| 6,052,066 A * | 4/2000 | Su ........................ 340/870.16 |
| 6,061,243 A * | 5/2000 | Barnett et al. ............... 361/704 |
| 6,091,332 A | 7/2000 | Eberhardt et al. ....... 340/572.1 |
| 6,130,602 A | 10/2000 | O'Toole |
| 6,150,944 A | 11/2000 | Martin et al. ................ 340/632 |
| 6,189,208 B1 * | 2/2001 | Estes et al. .................... 29/840 |
| 6,265,674 B1 * | 7/2001 | Kato ........................... 174/261 |
| 6,313,643 B1 | 11/2001 | Tirkel et al. |
| 6,370,812 B1 | 4/2002 | Burns et al. |
| 6,404,210 B1 | 6/2002 | Su |
| 2001/0033230 A1 | 10/2001 | Barber et al. |
| 2002/0144453 A1 | 10/2002 | Su |

\* cited by examiner

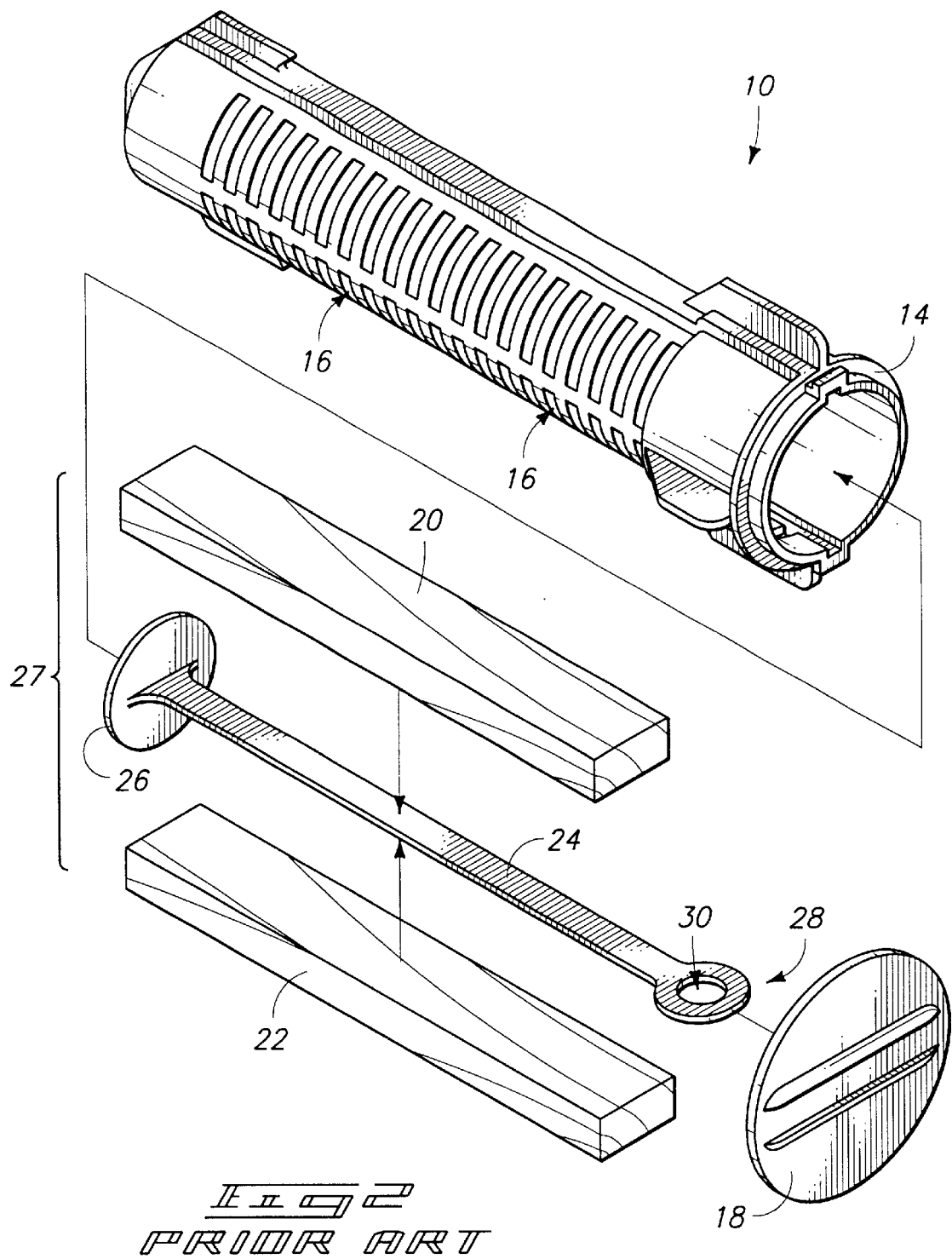

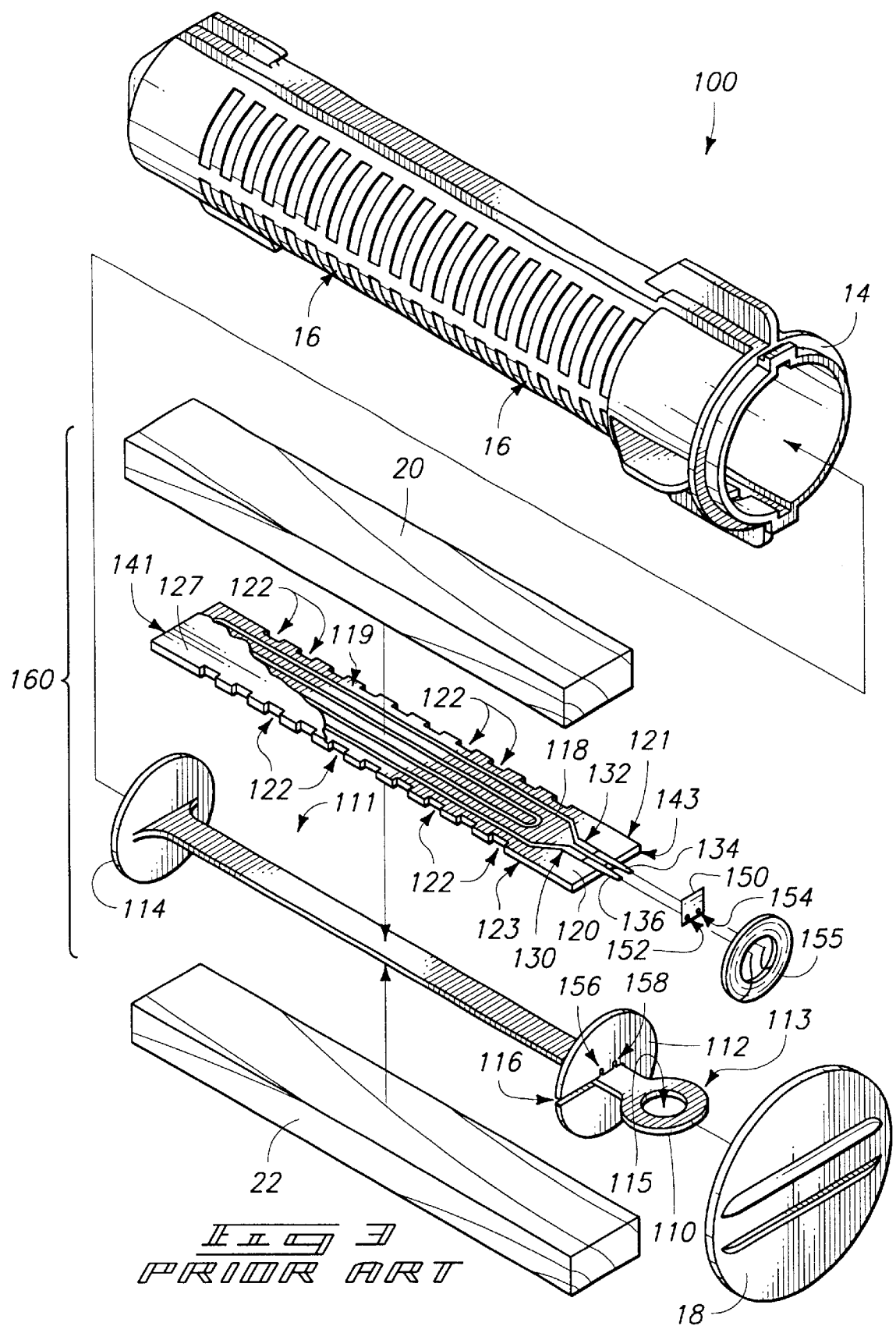

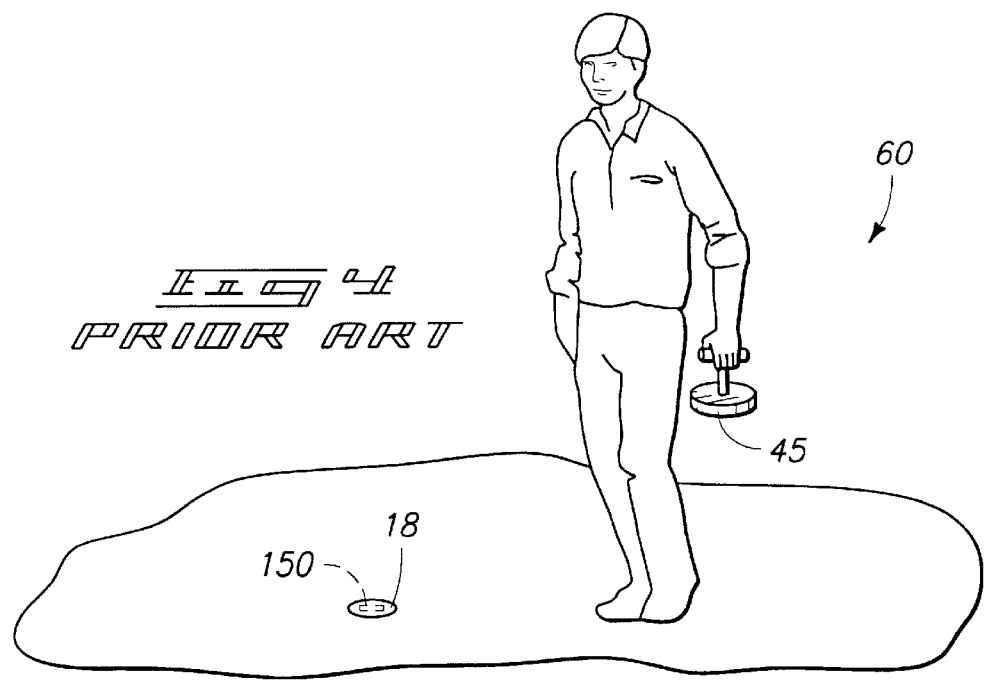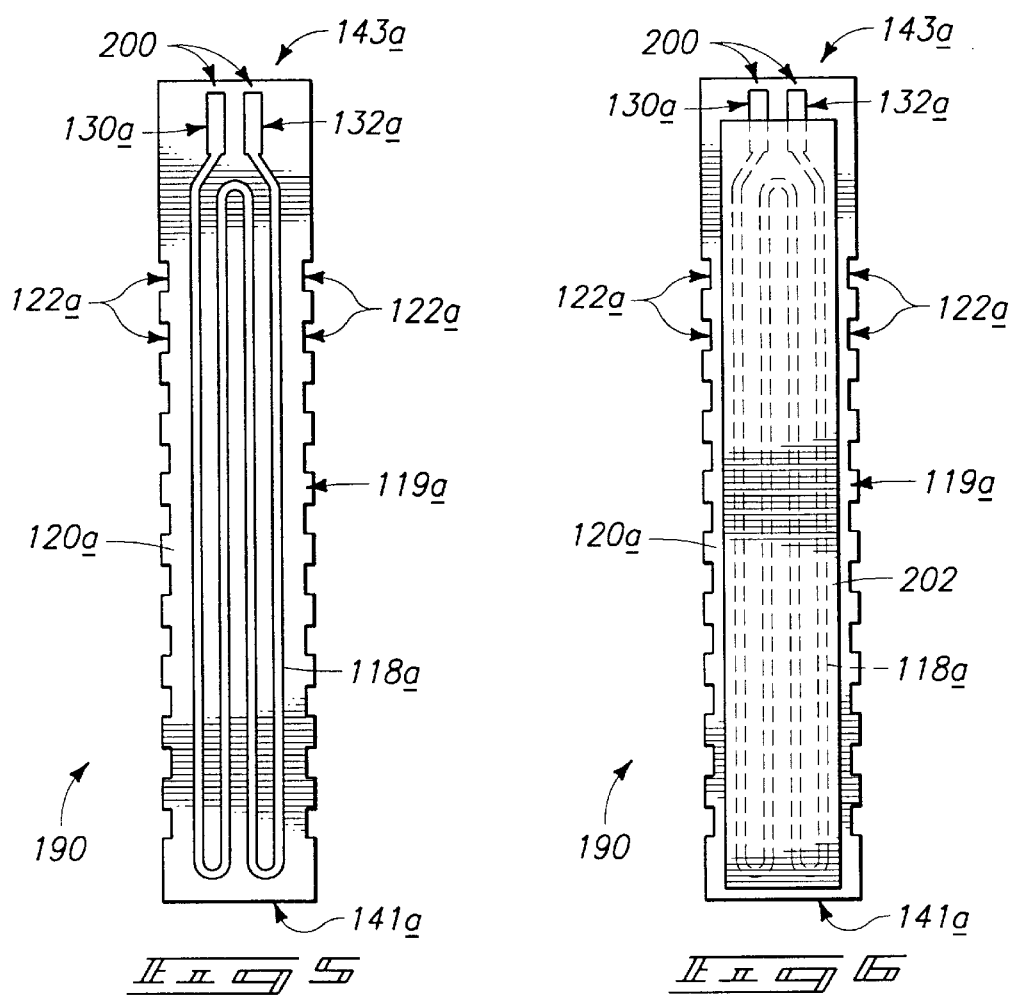

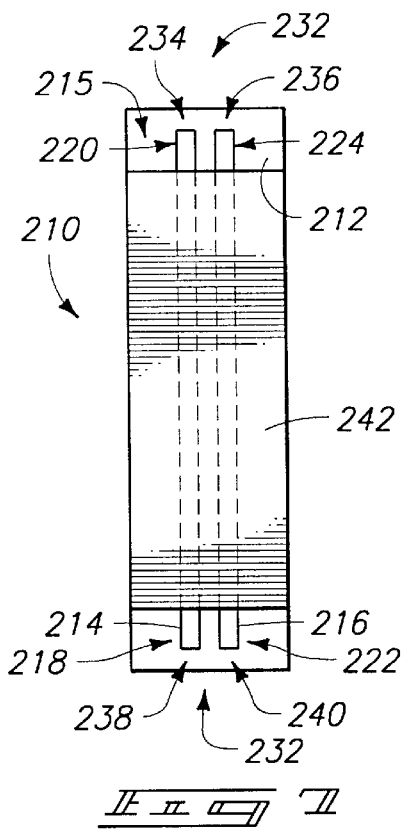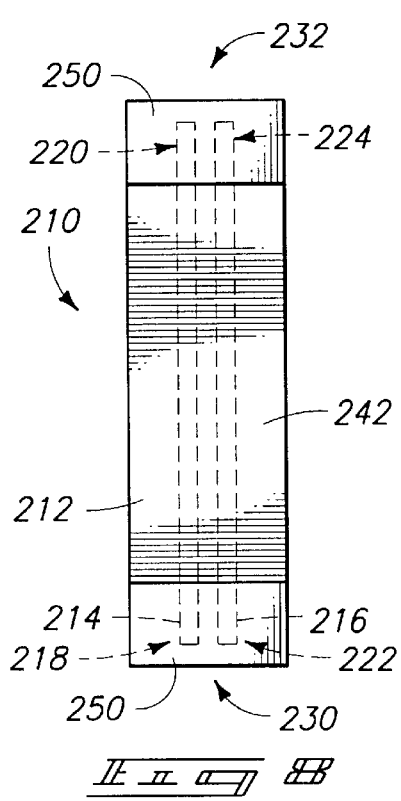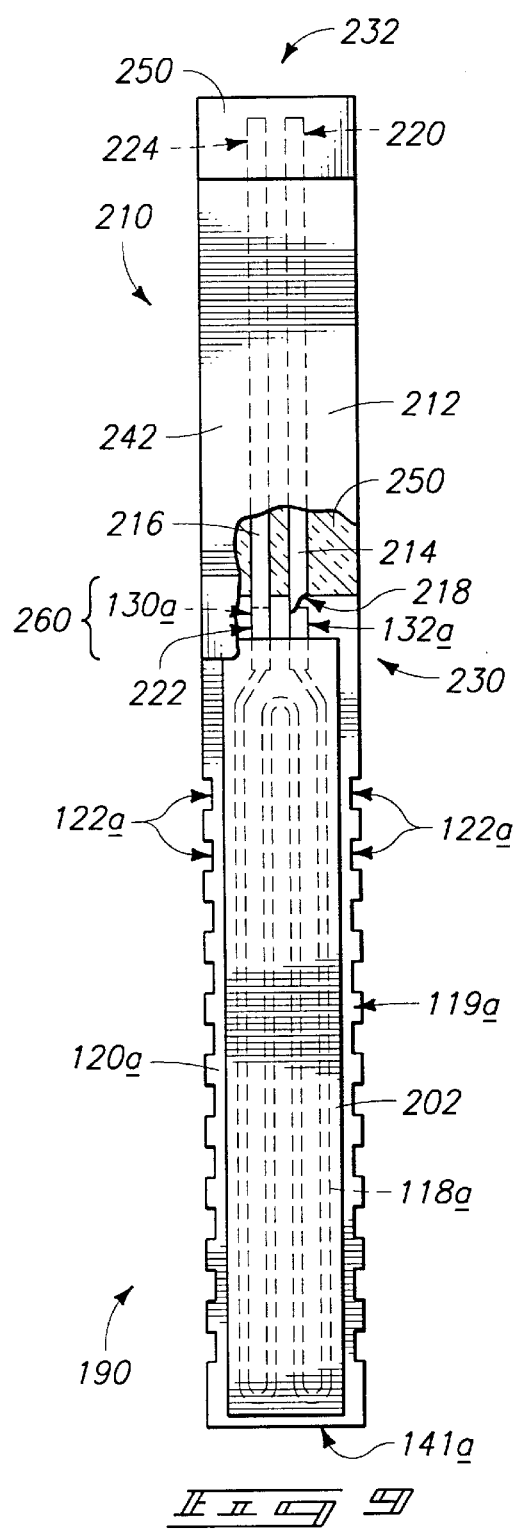

ELECTRICAL APPARATUSES, AND METHODS OF FORMING ELECTRICAL APPARATUSES

RELATED PATENT DATA

This patent resulted from a divisional application of U.S. patent application Ser. No. 09/384,837, which was filed on Aug. 27, 1999, now U.S. Pat. No. 6,313,748, the disclosure of which is incorporated by reference.

TECHNICAL FIELD

The invention pertains to electrical apparatuses, termite sensing apparatuses, methods of forming electrical apparatuses, and methods of sensing termites.

BACKGROUND OF THE INVENTION

A prior art apparatus and method for detecting termite infestation is described with reference to FIGS. 1 and 2. Specifically, a termite detection device 10 is shown in an assembled configuration and inserted within the ground 12 in FIG. 1, and is shown in a disassembled configuration in FIG. 2. Device 10 comprises an outer receptacle 14 having a plurality of orifices 16 (only some of which are labeled) extending therethrough. A cap (or a lid) 18 is provided to cover the top of receptacle 14. Preferably, receptacle 14 is inserted into the ground to a depth at which cap 18 will rest approximately at a surface of the ground.

A pair of wooden blocks 20 and 22 are provided within receptacle 14, and constitute "bait" for termites proximate to device 10. A holder 24 is provided between blocks of wood 20 and 22 and comprises a shelf 26 upon which blocks 20 and 22 rest. Holder 24 and blocks 20 an 22 together comprise an assembly 27 which can be removably inserted into receptacle 14.

Holder 24 comprises a portion 28 which protrudes upwardly beyond blocks 20 and 22 in the assembled configuration of FIG. 1. Portion 28 comprises an eye 30 (shown in FIG. 2) which can simplify removal of assembly 27 from receptacle 14 using a tool with a hook.

In operation, receptacle 14 is inserted into ground 12, and blocks 20 and 22 are subsequently left in receptacle 14 for a period of time. Blocks 20 and 22 function as a sensing apparatus to determine if a termite infestation is present in an area proximate device 10. Specifically, if termites are present, such will penetrate through orifice 16 to reach wooden blocks 20 and 22. The termites will then burrow into the wooden blocks 20 and 22.

At regular intervals, cap 18 is removed and blocks 20 and 22 withdrawn from device 14. Blocks 20 and 22 are then surveyed for termite-inflicted damage, and possibly a presence of termites themselves.

Generally, a number of apparatuses 10 will be spread around a given location, such as, for example, a house or other wooden structure. Each of the apparatuses will be checked at a regular interval to determine if a termite infestation is occurring proximate the structure. Also, each of the devices will be mapped relative to one another, and relative to the structure. A comparison of the amount of termite-inflicted damage occurring at the respective devices 10 can then enable a person to determine an approximate localized region of any occurring termite infestation. It can be advantageous to pinpoint a localized region of infestation as such can limit an amount of pesticide utilized for destroying the termites.

Difficulties can occur in monitoring the amount of termite-inflicted damage occurring at each of the many devices 10 provided around a structure. For instance, it can be difficult to regularly and accurately document the amount of damage at each of the devices. As an example, it can be difficult to remember exactly which of the various devices correlates to a specific location on a map of the devices. As another example, it can be difficult to accurately record a reading of termite-inflicted damage associated with an individual device. As yet another example, it can be tedious and time-consuming to open all of the receptacles 14 proximate the given structure and manually check the blocks 20 and 22 within the receptacles for termite-inflicted damage.

One method of reducing the above-discussed difficulties is to provide bar codes on the lids 18 of receptacles 14. Such bar codes can be scanned to specifically identify a particular device which can simplify correlating the devices to locations on a map of the devices. However, ascertaining an amount of termite-inflicted damage can still be time-consuming in that the receptacles still have to be opened and the blocks of wood manually checked to determine if termite-inflicted damage has occurred to the wood.

A recently proposed improvement for monitoring an amount of termite-inflicted damage in a device similar to device 10 is described with reference to FIGS. 3 and 4. Referring to FIG. 3, a device 100 comprises a receptacle 14 of the type described above with reference to FIG. 1, and comprises a cap 18 configured to be received over an open type of receptacle 14. Device 100 further comprises the pair of wooden blocks 20 and 22, and a holder 110 similar to the holder 24 described above with reference to FIG. 1. Holder 110 can comprise, for example, plastic, and differs from holder 24 in that it comprises both a top shelf 112 and a bottom shelf 114, whereas holder 24 only comprised a bottom shelf. In the shown embodiment, shelf 112 is configured with a slit 116 so that shelf 112 can be slid over a prior holding device (such as the device 24 of FIG. 1) to form the holding device 110. Slit 116 is optional, and shelf 112 can be molded in one piece with the other components of holder 110. Holder 110 can be considered as comprising a pillar 111 extending between shelves 112 and 114, and an extension 113 protruding above shelf 112. Extension 113 is configured to enable a person to lift holder 110 by the extension, and in the shown embodiment comprises an eye 115 extending therethrough. Shelf 112 can comprise an electrically insulative material, such as, for example, plastic (for instance, polypropylene).

Device 100 further comprises an electronic termite sensing loop 118 of conductive material. Loop 118 is formed on a substantially planar substrate 120, and is preferably formed of material which can be removed by termites. Exemplary materials are printable materials comprising conductive particles, such as, for example, metal particles or carbon particles. Suitable materials are, for example, silver-filled printed thick film ink and silver-filled epoxy. An exemplary silver-filled ink is Dupont Electronics 5028™ (available from Dupont Electronics of Wilmington, Del.), which is a silver polymer conductor. Another suitable material for loop 118 is a carbon-particle-containing ink (typically the particles will consist essentially of carbon), such as, for example, a material marked by Dupont Electronics as 7102™ Carbon Polymer Conductor (available from Dupont Electronics of Wilmington, Del.). Carbon-particle-containing inks can be cheaper than other inks, better accepted by pests (i.e., apparently more palatable to the pests), and less subject to environmental damage. Further, the inclusion of carbon inks in a circuit can lower an electrical conductivity (i.e., raise a resistivity) of the circuit. The lowered conductivity can increase the reliability of data obtained from the circuit. More specifically, the inclusion of carbon-particle-containing inks in loop 118 can render the circuit of loop 118 less susceptible to registering false negative readings if mud or water bridges an opening in the circuit.

Substrate 120 is preferably formed of material which can be removed by termites. Exemplary materials are polyethylene foam and polyester. The conductive material of loop 118 can be directly applied to substrate 120 using, for example, screen printing methods. Substrate 120 can be pretreated prior to applying the conductive material of loop 118 over substrate 120. Such pretreatment can comprise, for example, flame pretreatment to promote adhesion of the conductive material to the foam.

An electrically insulative protective material 127 (only some of which is shown in FIG. 3) is provided over loop 118 and substrate 120. Protective material 127 can protect conductive loop 118 from water, abrasion or other environmental damage. The insulative protective material can comprise, for example, a resin which is provided as a liquid and cured by exposure to one or more of heat, ultraviolet light and oxygen. A suitable insulative protective material is a material selected from the general class of epoxy resins (such as, for example, a two-part epoxy resin). Another suitable insulative protective material is a material selected for the general class of thick film inks. Exemplary insulative protective materials are Dupont 5015™ and 5018™ (available from Dupont Electronics of Wilmington, Del.), with 5018™ being an ultraviolet light curable dielectric material. Another exemplary insulative protective material is a tape adhered over loop 118 with an adhesive.

A termite attractant (such as, for example, a suitable pheromone) can be provided in addition to the insulative protective material. Such attractant can, for example, be formed over the insulative protective material or blended within the insulative protective material.

In the shown configuration, substrate 120 comprises a pair of opposing sidewall edges 121 and 123, and a plurality of notches 122 extending into sidewall edges 121 and 123. Notches 122 are provided to form crevices within which the termites can burrow.

Conductive loop 118 comprises a pair of ends (130 and 132), with end 132 connected to a first prong 134 and end 130 connected to a second prong 136. Device 100 further comprises a circuit board 150 having circuitry (not shown in FIG. 3) supported thereby and a pair of orifices (152 and 154) extending therethrough. Board 150 can be considered as a circuit support. Shelf 112 has a pair of orifices 156 and 158 extending therethrough, and configured to be aligned with orifices 152 and 154 of circuit board 150. In operation, device 100 is assembled by providing substrate 120 within holder 114 such that prongs 134 and 136 extend through orifices 156, 158, 152 and 154 to retain circuit board 150 atop shelf 112. Circuit board 150 can then be adhered to shelf 112 and/or prongs 134 and 136. Blocks 20 and 22 are subsequently provided within holder 110 to form an assembly 160 which can be removably inserted within receptacle 14.

The circuitry supported by circuit board 150 can comprise at least a portion of a transponder unit and is configured to be incorporated into a passive radio frequency identification device (RFID) system. The transponder unit can comprise, for example, a parallel resonant LC circuit, with such circuit being resonant at a carrier frequency of an interrogator. The transponder unit is in electrical connection with an antenna 155 provided externally of the circuitry supported by board 150. Exemplary circuit board/transponder unit assemblies are described in U.S. patent application Ser. No. 08/705,043, filed Aug. 29, 1996, which is assigned to the assignee of the present invention and hereby incorporated by reference.

Referring to FIG. 4, an RFID system 60 comprises the transponder supported by a structure 150 (which can comprise, for example, a circuit board) and an interrogator 45 configured to be passed over such transponder unit. Interrogator 45 comprises a coil antenna configured to stimulate the transponder unit. Such coil antenna consists of one or more coils of conductive material provided within a single plane, and can be in the form of, for example, a loop antenna.

In operation, interrogator 45 provides a carrier signal which powers (stimulates) the transponder unit supported by board 150 and causes a signal to be transmitted from the transponder unit. The signal comprises data which identifies the transponder unit. Such signal can also identify if the conductive loop 118 is broken. The signal is received by interrogator 45, and eventually provided to a processing system configured to decode and interpret the data. Such processing system can be provided in a portable unit with interrogator 45, or can be provided in a separate unit to which data from interrogator 45 is subsequently downloaded.

By having a signal from the transponder unit change with a break in circuit 118, device 100 can indicate if damage has occurred to loop 118 through a signal sent to an interrogator. Such can enable persons utilizing the device to ascertain if termites are present without having to remove blocks 20 and 22 from receptacle 14, and even without having to remove the lid 18 from receptacle 14. Once damage to circuit 118 is detected with an interrogator, persons can remove assembly 160 and quantitate an amount of damage occurring within blocks 20 and 22 to determine an extent of termite infestation.

The device 160 is suitable for many applications in which it is desired to detect termite infestation. However, the device can be difficult to assemble and utilize in particular applications. Accordingly, it would be desirable to develop alternative devices for detecting termite infestation.

SUMMARY OF THE INVENTION

In one aspect, the invention encompasses an electrical apparatus. Such apparatus comprises a first substrate having first circuitry supported thereby. The first circuitry defines at least a portion of a radio frequency identification device. At least one first electrical node is supported by the substrate and in electrical connection with the first circuitry. The apparatus further comprises an input device comprising a second substrate and second circuitry on the second substrate. The second circuitry is in electrical communication with at least one second electrical node. Neither of the first nor second electrical nodes is a lead, and the second electrical node is adhered to the first electrical node to electrically connect the input device with the radio frequency identification device.

In another aspect, the invention encompasses a termite-sensing apparatus. Such apparatus comprises a first substrate having first circuitry supported thereon, with the first circuitry defining at least a portion of a radio frequency identification device. At least one first electrically conductive node is supported by the substrate and in electrical connection with the first circuitry. The apparatus further comprises a second substrate having second circuitry supported thereon. At least some of the second circuitry is removable by termites. The second circuitry is in electrical communication with at least one second electrical node. Neither the first or second electrical node is a lead. The second electrical node is adhered to the first electrical node to electrically connect the input device with the radio frequency identification device. The apparatus is configured such that a break in the second circuitry alters a signal transponded by the transponder unit.

In other aspects, the invention encompasses methods of forming electrical apparatuses, and methods for sensing termites.

BRIEF DESCRIPTION OF THE DRAWINGS

Preferred embodiments of the invention are described below with reference to the following accompanying drawings.

FIG. 2 is a perspective view of the prior art termite sensing device of FIG. 1 in a disassembled configuration.

FIG. 3 is a disassembled view of a prior art electronic sensor configured to detect termite infestation.

FIG. 4 is a diagrammatic view of a person extracting information from the prior art electronic termite sensing device of FIG. 3.

FIG. 5 is a diagrammatic view of a first portion of a termite sensing device encompassed by the present invention at an initial step of a method of the present invention.

FIG. 6 is a view of the FIG. 5 portion shown at a processing step subsequent to that of FIG. 5.

FIG. 7 is a diagrammatic view of a second portion of a termite sensing device of the present invention, and shown at an initial processing step.

FIG. 8 is a view of the FIG. 7 portion shown at a processing step subsequent to that of FIG. 7.

FIG. 9 is a diagrammatic view of an assembly comprising the first portion of FIG. 6, and the second portion of FIG. 8.

DETAILED DESCRIPTION OF THE PREFERRED EMBODIMENTS

Figure 1:
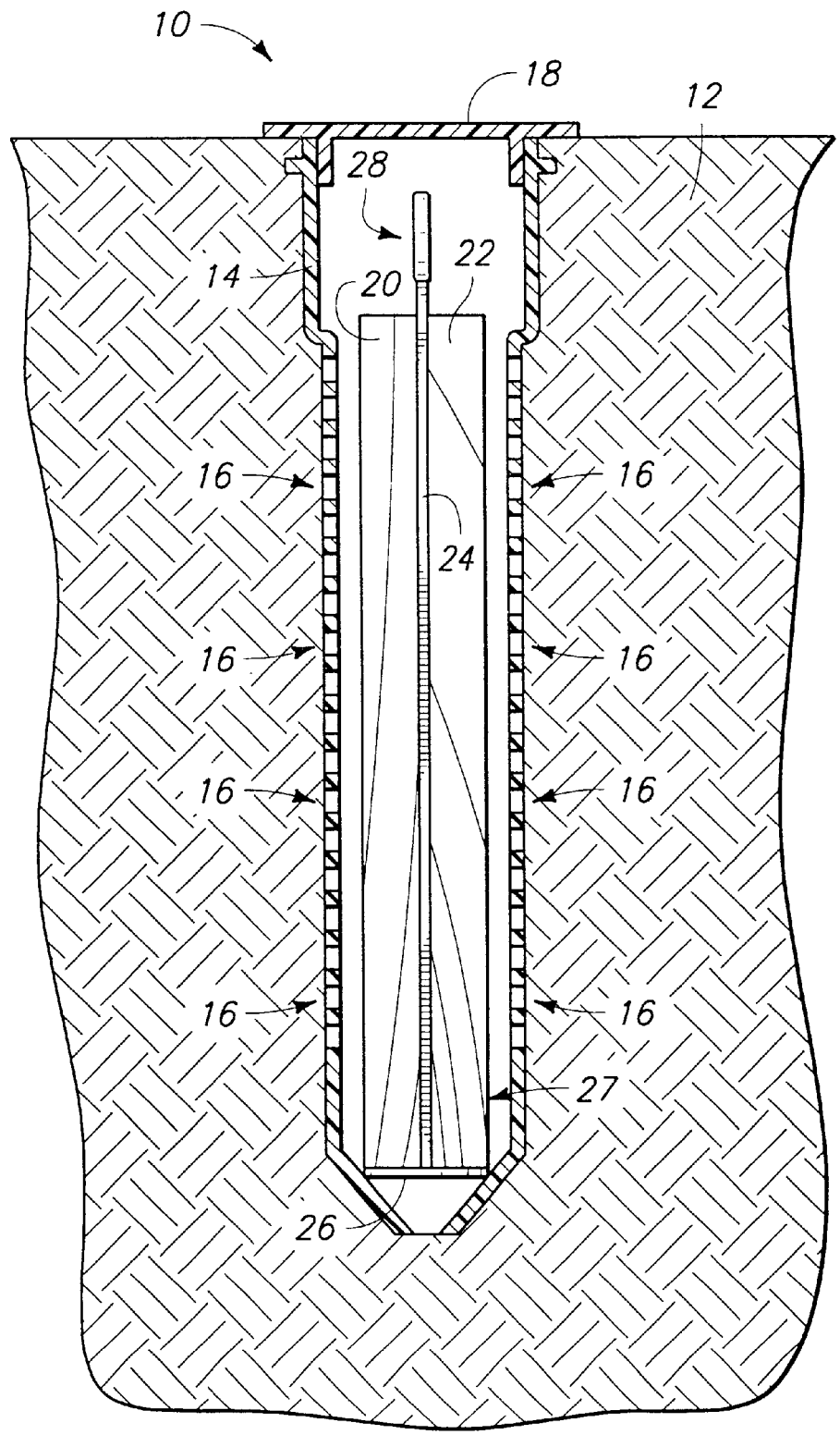
FIG. 1 is a diagrammatic, cross-sectional view of an assembled prior art termite sensing device embedded in the ground.

This disclosure of the invention is submitted in furtherance of the constitutional purposes of the U.S. Patent Laws "to promote the progress of science and useful arts" (Article 1, Section 8).

A difficulty which can occur in forming the prior art termite sensing device of FIG. 3 is in connecting circuit support 150 with prongs 134 and 136. It is desired to have the circuitry associated with support 150 be planar along a surface of the ground so that it can be readily stimulated by an interrogator passed along the ground surface and over such circuitry, and it is further desirable to have the circuitry of loop 118 extending perpendicular with the surface of the ground so that such circuitry is likely to be intercepted by termites passing at various depths beneath a ground surface. An apparent solution for connecting loop 118 to circuitry associated with board 150, without having to utilize prongs 134 and 136, is simply to bend support 120 so that part of loop 118 will extend perpendicular to a ground surface, and another part (specifically, the ends of the loop) will extend substantially parallel with the surface of the ground. However, such will require about a 90° bend in foam substrate 120, which would likely break the substrate and accordingly break the circuit of loop 118. The present invention provides a mechanism by which circuitry can be bent to enable a connection from the conductive loop extending perpendicular to a ground surface to a transponder circuit extending parallel with the ground surface.

Figure 12:
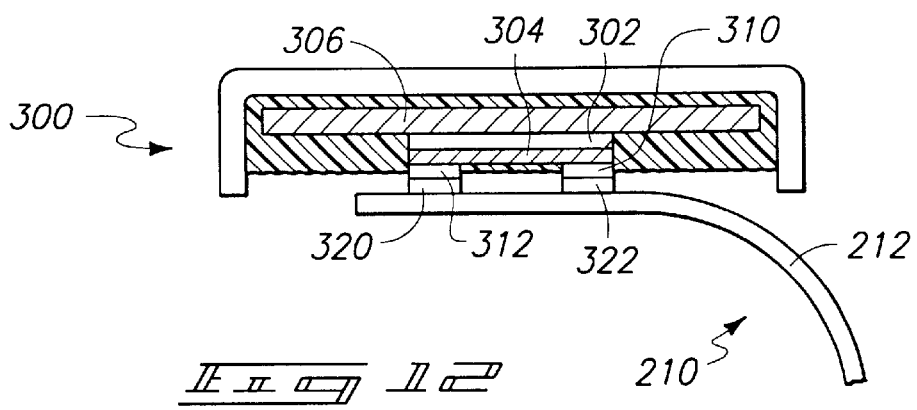
FIG. 12 is a view of an construction comprising the transponder circuit construction of FIGS. 10 and 11 joined to a fragment of the FIG. 9 assembly.
Figure 13:
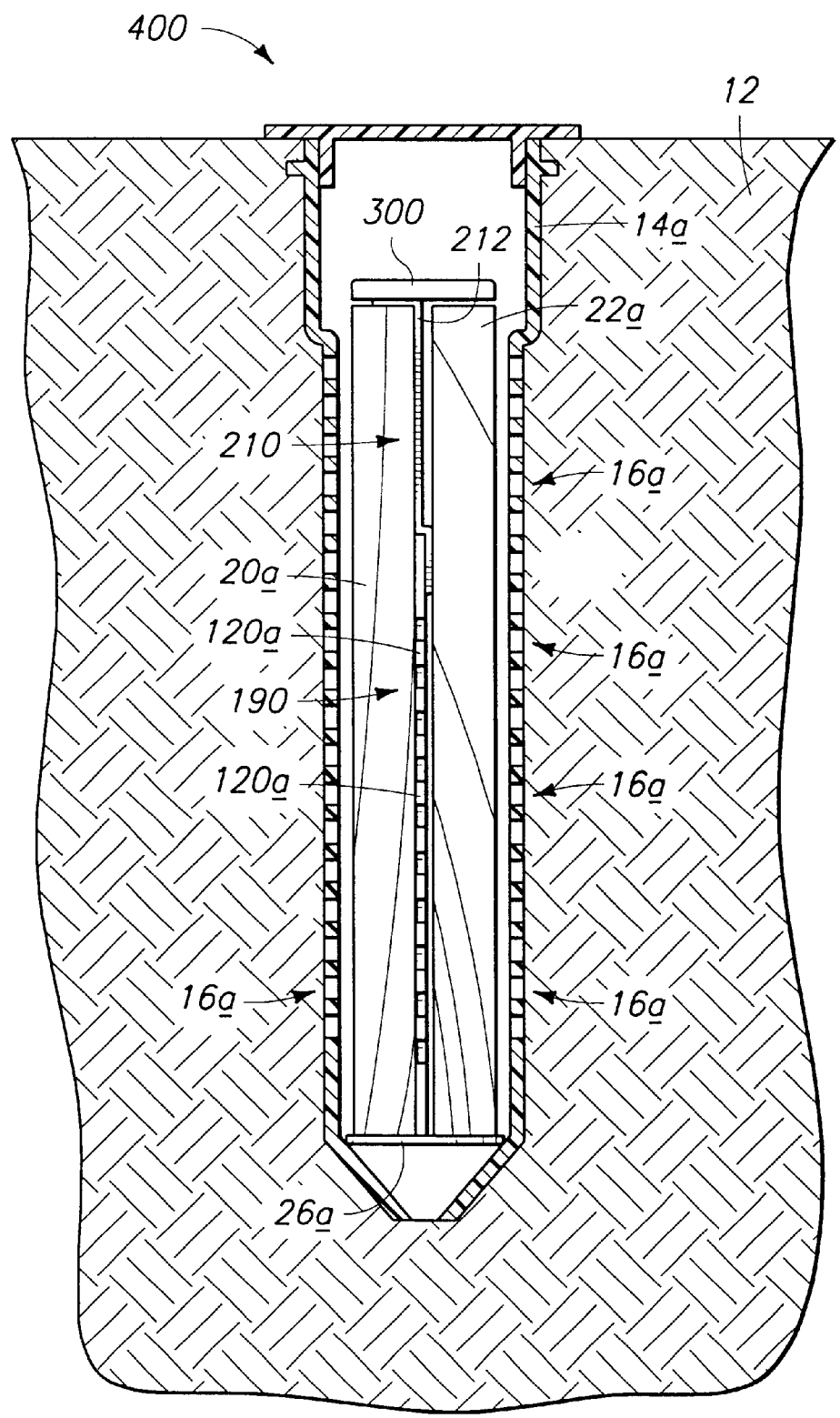
FIG. 13 is a diagrammatic side view of a termite sensing device encompassed by the present invention.

An assembly encompassed by the present invention is shown in FIG. 13, and a method of forming such assembly is described with reference to FIGS. 5–13. In referring to FIGS. 5–13, similar numbering will be utilized as was used in describing the prior art, with the suffix "a" used to differentiate structures of FIGS. 5–12 from the corresponding structures o f the prior art FIGS. 1–4.

Referring to FIG. 5, a first portion 190 of a termite sensing device of the present invention is shown. Portion 190 comprises a first substrate 120a. Substrate 120a is similar to substrate 120 of the prior art (FIG. 3), and preferably comprises a material which can be removed by termites, and can comprise, for example, polyethylene foam. Substrate 120a comprises notches 122a formed therein, and such notches can provide crevices within which termites can burrow.

Substrate 120a has an upper surface 119a, and a conductive material loop 118a is formed on such surface. Loop 118a can be formed utilizing methodology described above for forming loop 118 (FIG. 3), such as, for example, by screen printing one or both of a carbon-particle-containing ink and a metal-containing ink onto substrate 120. Loop 118a has a pair of ends (or terminals) 130a and 132a extending therefrom. Terminals 130a and 132a define first and second electrical nodes, respectively. Terminals 130a and 132a comprise a thickened region of the conductive material relative to the rest of loop 118a. Such thickened region of conductive material can simplify connection of terminals 130a and 132a to other circuitry (described below).

Substrate 120a has a pair of opposing ends 141a and 143a. Terminals 130a and 132a are proximate end 143a of substrate 120a, but are spaced from such end by gaps 200. Such spacing can enable terminals 130a and 132a to be completely protected from the environment by simply providing a protective covering over surface 119a and loop 118a. In contrast, if terminals 130a and 132a extended all the way to end 143a, the terminals would have a surface exposed over end 143a, and such surface could be difficult to protect from the environment. It is to be understood, however, that the shown embodiment is an exemplary embodiment, and that the invention encompasses other embodiments (not shown) having other configurations. Such other embodiments include, for example, embodiments in which terminals 130a and 132a extend to, and even beyond, end 143a.

Referring to FIG. 6, a dielectric material 202 is provided over a predominate portion of conductive loop 118a (shown in phantom view in FIG. 6). Specifically, dielectric material 202 covers an entirety of loop 118a except for the ends of terminals 130a and 132a. The uncovered ends 130a and 132a define first and second electrical nodes, respectively. Dielectric material 202 can comprise, for example, materials described above for prior art layer 127 (FIG. 3), and can form a fluid-tight protective layer over conductive loop 118a. Dielectric material 202 can have a termite attractant (such as, for example, a termite-attracting pheromone) mixed therein.

Referring to FIG. 7, a second portion 210 of a termite sensing device of the present invention is shown. Portion 210 comprises a second substrate 212 having an upper surface 215, and pair of conductive lines 214 and 216 formed on surface 215. Substrate 212 preferably comprises a flexible material, such as, for example, polyester or other plastics. Conductive lines 214 and 216 can comprise the same material utilized for conductive loop 118a, and can be printed onto substrate 212 by, for example, screen printing. In embodiments in which substrate 212 comprises an insulative material, conductive lines 214 and 216 can be printed directly onto the material. In other embodiments (not shown) substrate 212 can comprise a conductive material, and a dielectric material can be provided over such conductive material prior to the forming of conductive lines 214 and 216 over the substrate. Conductive lines 214 and 216 together comprise a circuit pattern formed over substrate 212. Conductive line 214 can be referred to as a first conductive line, and conductive line 216 can be referred to as a second conductive line.

First conductive line 214 comprises a pair of ends (218 and 220), and second conductive line 216 comprises another pair of ends (222 and 224). End 222 of second conductive line 216 is proximate end 218 of first conductive line 214, and end 224 of second conductive line 216 is proximate end. 220 of first conductive line 214. Ends 218, 220, 222 and 224 define electrical nodes. Electrical nodes 222 and 224 are referred to herein as a third electrical node and fourth electrical node, respectively, and electrical nodes 218 and 220 are referred to herein as a fifth and sixth electrical node, respectively.

Substrate 212 comprises a pair of opposing ends 230 and 232. Conductive lines 214 and 216 are spaced from end 230 by gaps 234 and 236, respectively, and are spaced from end 232 by gaps 238 and 240, respectively.

A dielectric material 242 is formed over a predominate portion of lines 214 and 216. Dielectric material 242 can comprise the same materials described above with reference to dielectric material 127 of the prior art (FIG. 3). Dielectric material 242 does not cover the ends of conductive lines 214 and 216, and accordingly leaves the third, fourth, fifth and sixth electrical nodes exposed. Dielectric material 242 can form a fluid-tight protective coating over the predominate portion of lines 214 and 216 covered by such dielectric material.

Referring to FIG. 8, a conductive material 250 is provided over ends 218, 220, 222 and 224. Conductive material 250 can comprise, for example, an adhesive having conductive particles dispersed therein. A suitable adhesive is 3M #9703™ electrically conductive adhesive transfer tape (Z-axis tape), available from 3M Corporation of St. Paul, Minn. The material is referred to as a Z-axis adhesive because such material conducts electricity only in a Z-axis direction. Accordingly, the material will not form a short between conductive lines 214 and 216, but can form electrical connections from conductive lines 214 and 216 to other circuitry formed thereover. In the preferred embodiment, the conductive adhesive overlaps the edges of dielectric material 242, and extends from the edges to ends 230 and 232 of substrate 212. The Z-axis adhesive 250 and dielectric material 242 thus can together comprise a fluid-tight seal which extends entirely over conductive lines 214 and 216, as well as entirely over the surface 215 of substrate 212 (FIG. 7).

In embodiments in which the conductive adhesive 250 comprises a Z-axis tape, the adhesive will be provided with a release liner adhered thereto. Such release liner can be left in place in forming the construction shown in FIG. 8.

Referring to FIG. 9, the assembly 210 of FIG. 8 is adhered to the assembly 190 of FIG. 6 utilizing the adhesive 250 proximate end 230. (In embodiments in which conductive adhesive 250 comprises a Z-axis tape, the release liner over Z-axis tape 250 proximate end 230 will be removed prior to forming the construction of FIG. 9.) The assembly 210 is inverted relative to assembly 190 in the FIG. 9 construction such that so-called upper surface 215 (FIG. 7) of substrate 212 faces downwardly toward upper surface 119a of substrate 120a. Such enables electrical connection of nodes 218 and 222 with nodes 132a and 130a, respectively.

Substrate 212 overlaps with substrate 120a in an overlap region 260. Also, third electrical node 222 overlaps with first electrical node 130a in overlap region 260, and fifth electrical node 218 overlaps with second electrical node 132a in such overlap region. Conductive material 250 bonds third electrical node 222 to first electrical node 130a, and fifth electrical node 218 to second electrical node 132a. In embodiments in which material 250 comprises a Z-axis adhesive, such material can form a conductive bond between the first and third nodes, as well as between the second and fifth nodes, without causing a short between conductive lines 214 and 216.

In the shown embodiment, dielectric material 202 and dielectric material 242 both extend into the overlap region 260. Such can assist in forming a water-tight seal within overlap region 260. A water-tight seal is desired to prevent water from leaking between lines 214 and 216, and causing an electrical short between such lines.

Figure 10:
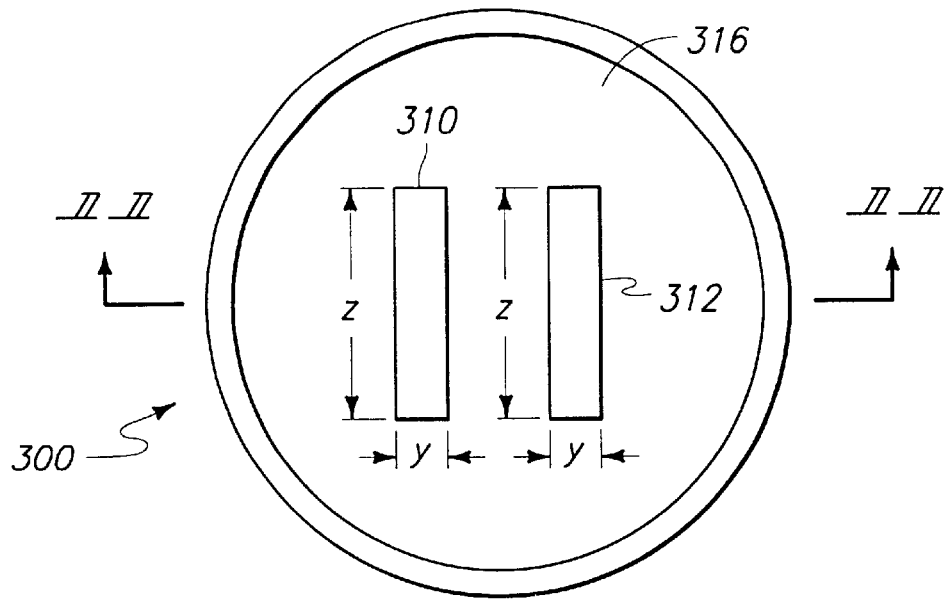
FIG. 10 is a top view of a transponder circuit construction being assembled in accordance with a method of the present invention.
Figure 11:
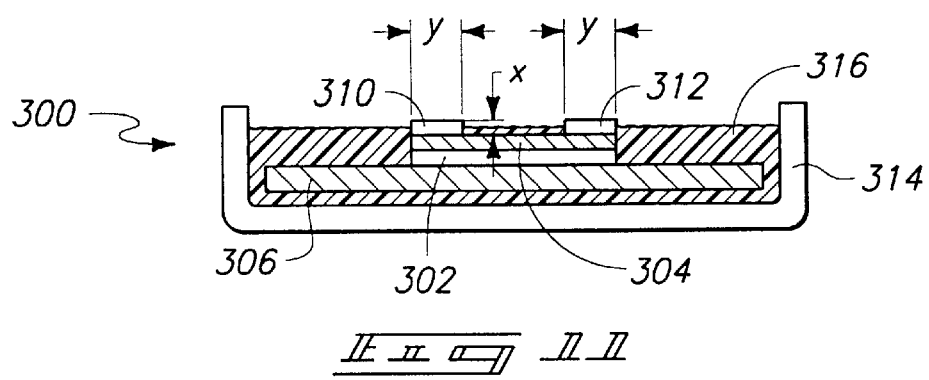
FIG. 11 is a diagrammatic cross-sectional view of the construction of FIG. 10, shown along the line 11—11 of FIG. 10.

Referring to FIGS. 10 and 11, a transponder assembly 300 is shown in a top view (FIG. 10), and in a cross-sectional side view (FIG. 11). Transponder assembly 300 comprises a circuit supporting substrate 302, which can comprise, for example, a circuit board. Circuitry 304 is provided over circuit-supporting substrate 302, and a coil 306 is provided beneath circuit-supporting substrate 302. Circuitry 304 preferably comprises at least a portion of a transponder unit, and in preferred embodiments, comprises at least a portion of a radio frequency identification device (RFID). Coil 306 is preferably configured as an antenna for the RFID device of circuitry 304. Substrate 302, and coil 306 can be similar to, for example, substrate 150 and antenna 155, respectively, that were discussed above in the "Background" section of this disclosure.

Conductive circuit pads 310 and 312 are provided on circuitry 304, and define electrical nodes for connection of external circuitry (not shown in FIGS. 10 and 11) to circuitry 304. Pads 310 and 312 can comprise, for example, a conductive ink, and can be formed by, for example, screen printing. It is noted that pads 310 and 312 are not conductive leads. For purposes of interpreting this disclosure and the claims that follow, the term "electrical lead" refers to an electrical connection which is longer than it is wide, with the length being defined as a dimension of the conductive material extending away from the circuitry connected to the conductive material. Accordingly, pads 310 and 312 have lengths "X" (shown in FIG. 11), and have widths "Z" and "Y" (FIG. 10) which are wider than the length "X". Note that either of "Y" or "Z" can be considered a width of pads 310 and 312 depending on the side from which the pads are viewed. For instance, in the view of FIG. 11, pads 310 and 312 have a length "X" and a width "Y". It is noted that "Y" corresponds to a minimum width of pad 310, and that such minimum width is longer than any maximum length to which pad 310 extends outwardly (shown as upwardly) from circuitry 304.

The circuit support 302, and associated coil 306, circuitry 304, and pads 310 and 312, are shown placed within a potting cup 314. Also shown is an encapsulant 316 which has been poured within cup 314 and over circuitry 304, and coil 306, while leaving pads 310 and 312 exposed. Encapsulant 316 can comprise, for example, an epoxy resin. The encapsulant 316 is provided as a liquid, and subsequently cured to harden the encapsulant into a solid which protects circuitry 304 and coil 306 from moisture. In particular embodiments, the potting cup can be utilized as a mold. Specifically, a release material can be provided within potting cup 314 prior to forming encapsulant 316 within the cup, and after the encapsulant is hardened it can be removed from cup 314 together with the board 302, coil 306, circuitry 304, and pads 310 and 312. Alternatively, potting cup 314 can be adhered to encapsulant 316 as the encapsulant cures, such that potting cup 314 becomes part of a transponder device formed within potting cup 314. In any event, after encapsulant 316 cures, surfaces of pads 310 and 312 remain exposed through the encapsulant for subsequent electrical connection to an electrical device.

Referring to FIG. 12, the device 300 of FIGS. 10 and 11 is shown attached to flexible portion 210 of FIG. 9. Specifically, pads 320 and 322 have been formed on exposed ends 220 and 224 (FIG. 9) of conductive lines 214 and 216, respectively. Pads 320 and 322 can be formed of screen-printed conductive ink, as described above for pads 310 and 312. Pads 320 and 322 constitute electrical nodes, and, like pads 310 and 312, are not leads. Pads 320 and 322 can be adhered to pads 310 and 312 utilizing a Z-axis adhesive tape, such as, for example, the 3M™ Z-axis tape described above. It is noted that although pads are shown associated with both transponder circuitry (specifically pads 310 and 312) and the circuitry on flexible portion 210 (specifically pads 320 and 322), the invention encompasses embodiments wherein the pads on one or both of the transponder circuitry and the circuitry on the flexible portion are eliminated. In such embodiments, the electrical connection between the transponder circuitry and the circuitry on the flexible portion can remain leadless so long as any nodes associated with such connection are wider than they are long.

FIG. 13 illustrates the construction of FIG. 12 incorporated into a termite-sensing device 400. The relative scales of portions 300 and 210 are changed in the view of FIG. 13 relative to FIGS. 5–12, with the relative scales of FIG. 13 being a more preferred application of the invention, and the relative scales of FIGS. 5–12 being utilized for illustration purposes.

FIG. 13 shows foam substrate 190 provided between a pair of wooden blocks 20a and 22a. Flexible portion 210 extends from between blocks 20a and 22a to over block 20a, and is bent around a corner of block 20a. Flexible portion 210 electrically connects circuitry associated with the non-flexible portion. 190 to the circuitry of transponder device 300. In operation, if termites remove enough of the circuitry from portion 190 to break loop 118a (FIG. 5), such will change a signal generated by the transponder device 300.

Accordingly, the circuitry associated with portion 190 functions as an input device to the transponder circuitry of assembly 300. It is noted that although in the shown embodiment non-flexible portion 190 is connected to assembly 300 through an intervening flexible portion 210, the invention encompasses other embodiments (not shown) wherein the circuitry of non-flexible portion 190 is directly coupled to circuitry of transponder assembly 300, rather than being coupled through an intervening flexible substrate.

The device 400 of FIG. 13 can be monitored for termite-inflicted damage by monitoring a signal transponded by transponder unit 300 to determine if a conductive loop associated with substrate 190 is broken.

Although the invention is described above with application to a termite sensing device, it is to be understood that the invention can be utilized in other applications wherein an input device is to be coupled to a transponder assembly. The leadless interconnection of the present invention can offer advantages relative to traditional mechanical lead connections. Specifically, the leadless interconnection can offer mechanical strength. For instance, it is not uncommon for leads to bend or break in operation. The leadless connection of the present invention can avoid such bending and breaking of leads by eliminating the leads from the circuit construction.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An electrical apparatus comprising:
   a first substrate having first circuitry supported thereby, the first circuitry oriented in a first plane and defining at least a portion of a radio frequency identification device;
   at least one first electrical node supported by the first substrate and in electrical connection with the first circuitry; and
   an input device comprising a second substrate and second circuitry on the second substrate, the second circuitry being in electrical communication with at least one second electrical node, the second substrate comprising a flexible portion wherein the second circuitry comprises a first portion oriented in a second plane angled relative the first plane, neither of the first or second electrical nodes being a lead, the second electrical node being adhered to the first electrical node to electrically connect the input device with the radio frequency identification device.

2. The electrical apparatus of claim 1 wherein the first electrical node is adhered to the second electrical node with a z-axis adhesive.

3. The electrical apparatus of claim 1 wherein at least one of the first and second electrical nodes comprises a conductive pad.

4. The electrical apparatus of claim 1 wherein the first substrate comprises a circuit board and the second substrate comprises an other portion of foam.

5. The electrical apparatus of claim 1 wherein the input device further comprises a third substrate having third circuitry supported thereby, the third substrate comprising foam and the second substrate comprising polyester, the circuitry on the third substrate being electrically connected to the circuitry on the second substrate.

6. The electrical apparatus of claim 1 wherein the flexible portion of the second substrate is more flexible than the first substrate.

7. An electrical apparatus comprising:

a first substrate having first circuitry supported thereby, the first circuitry oriented in a first plane and defining at least a portion of a radio frequency identification device;

at least one first electrical node supported by the first substrate and in electrical connection with the first circuitry, the first node extending in a direction outwardly from the first circuitry to define a maximum length of the first node, the first node also extending in an other direction along the first circuitry to define a minimum width of the first node, the minimum width of the first node being greater than the maximum length of the first node; and an input device comprising a second substrate and second circuitry on the second substrate, a first portion of the second circuitry oriented in a second plane at an angle relative the first plane and a second portion of the second circuitry oriented in a third plane generally parallel with the first plane, the second circuitry being in electrical communication with at least one second electrical node, the second node extending in a direction outwardly from the second circuitry to define a maximum length of the second node, the second node also extending in an other direction along the second circuitry to define a minimum width of the second node, the minimum width of the second node being greater than the maximum length of the second node; the second electrical node being adhered to the first electrical node to electrically connect the input device with the radio frequency identification device.

8. The electrical apparatus of claim 7 wherein the angle comprises substantially 90°.

9. A method of forming an electrical apparatus, comprising:

providing a first substrate having first circuitry supported thereby, the first circuitry oriented in a first plane and defining at least a portion of a radio frequency identification device;

providing at least one first electrically conductive node supported by the first substrate and in electrical connection with the first circuitry;

providing an input device comprising second circuitry on a second substrate, the second circuitry having at least one second electrical node associated therewith, neither of the first or second electrical nodes being a lead;

flexing the second substrate to orient a portion of the second circuitry in a second plane angled relative the first plane; and adhering the second electrical node to the first electrical node to electrically connect the input device with the radio frequency identification device.

10. The method of claim 9 wherein the first electrical node is adhered to the second electrical node with a z-axis adhesive.

11. The method of claim 9 wherein at least one of the first and second electrical nodes comprises a conductive pad.

12. The method of claim 9 wherein the first substrate comprises a circuit board and the second substrate comprises a portion of foam.

13. The method of claim 9 wherein the input device further comprises a third substrate having third circuitry supported thereby, the third substrate comprising foam and the second substrate comprising polyester, the method further comprising electrically connecting the circuitry on the third substrate being to the circuitry on the second substrate.

14. The method of claim 9 wherein the second substrate is more flexible than the first substrate.

15. The method of claim 9 wherein the flexing comprises orienting the portion of the second circuitry in the second plane substantially 90° relative the first plane.

16. The method of claim 9 wherein the flexing comprises orienting the at least one second electrical node in a third plane substantially parallel relative the first plane.

17. An electrical apparatus comprising:

a first substrate having first circuitry supported thereby, the first circuitry defining at least a portion of a radio frequency identification device;

at least one first electrical node supported by the first substrate and in electrical connection with the first circuitry; and an input device comprising a second substrate and a third substrate discrete from the second substrate, the second and third substrates comprising longitudinal shapes with opposite ends longitudinally spaced, an end of the second substrate secured to an end of the third substrate to form a unitary longitudinal structure, the second substrate comprising second circuitry in electrical communication with at least one second electrical node, the third substrate comprising a conductive loop in electrical communication with the second circuitry of the second substrate, and the second electrical node being adhered to the first electrical node to electrically connect the input device with the radio frequency identification device.

* * * * *

UNITED STATES PATENT AND TRADEMARK OFFICE
CERTIFICATE OF CORRECTION

PATENT NO. : 6,630,887 B2
DATED : October 7, 2003
INVENTOR(S) : Rickie C. Lake

It is certified that error appears in the above-identified patent and that said Letters Patent is hereby corrected as shown below:

<u>Column 3,</u>
Line 25, replace "insulative protective material is a material selected for the" with
-- insulative protective material is a material selected from the --

<u>Column 6,</u>
Line 23, replace "structures o f the prior art FIGS. 1-4." with -- structures of the prior art FIGS. 1-4. --

<u>Column 7,</u>
Line 33, replace "and end 224 of second conductive line 216 is proximate end." with
-- and end 224 of second conductive line 216 is proximate end --

<u>Column 9,</u>
Line 64, replace "flexible portion. 190 to the circuitry of transponder device" with
-- flexible portion 190 to the circuitry of transponder device --

Signed and Sealed this

Thirtieth Day of March, 2004

JON W. DUDAS
*Acting Director of the United States Patent and Trademark Office*